3,306,770
ELECTROLUMINESCENT PANEL

Eugene D. Klug and Richard A. Leonard, Wilmington, Del., assignors to Hercules Incorporated, a corporation of Delaware
No Drawing. Filed June 25, 1963, Ser. No. 290,327
4 Claims. (Cl. 117—215)

The present invention relates to improved electroluminescent panels and more particularly to such a panel wherein cyanoethyl starch is employed as a matrix in which phosphor particles are suspended. Hereinafter this matrix will be called the phosphor binder.

Several years ago it was discovered that a phosphor such as e.g. zinc sulfide emits light when placed in an alternating current electric field. This phenomenon, known as electroluminescence, is presently being applied in night lights, instrument panels, and similar applications for low level illumination. The phosphor is suspended in a plastic or ceramic matrix (phosphor binder) between two electrically conducting surfaces. One of these surfaces must transmit light, and tin oxide coated glass fulfills this requirement well. The other surface may be aluminum, or any other metal. Electrodes are connected to the two conducting surfaces and the whole unit is sealed to exclude moisture from the air. When alternating current is applied to the electrodes the phosphor particles are excited and light is visible through the glass.

One of the main advantages of an electroluminescent panel is that the unit is flat and thin. This makes it very desirable for signs, instrument panels, etc. The heat development and current consumption of electroluminescent panels are very low. For example, a night light in the home is said to operate about a year for one cent. The flatness and thinness of electroluminescent panels make them fairly useful in luminescent wall paper and drapes, which have been done on an experimental scale. Other advantages of electroluminescent panels are that by proper choice of phosphor different colored panels can be made and by choice of a mixture of phosphors panels can be made which change color when the frequency of the applied voltage is changed. However, one drawback of electroluminescent panels for a large number of uses is that their light is not as bright as desired.

One of the factors which has the most effect on the quality of the electroluminescent panels is the phosphor binder. Both ceramic and organic binders have been employed. One disadvantage of ceramic binders, however, is that their outdoor life is undesirably short.

A good binder for electroluminescent panels must have a high dielectric constant and a low dissipation factor. Under a given set of conditions, the higher the dielectric constant the brighter the electroluminescent panel. A low dissipation factor produces less heat development in the panel and this in turn gives greater efficiency and longer life.

In accordance with the present invention it has been found that cyanoethyl starch is a substantially better phosphor binder in electroluminescent panels than the best of such binders (i.e. cyanoethyl cellulose) heretofore known. Unless otherwise indicated all comparisons herein of the present invention (both general and specific) are with cyanoethyl cellulose phosphor binder and its use in electroluminescent panels. The following examples (wherein percent, parts and ratios are by weight unless otherwise indicated) illustrate specific embodiments of the present invention, but they are not intended to limit the present invention except as defined in the appended claims. All viscosities herein were measured at 25° C. using a Brookfield viscometer.

Example 1

Electroluminescent panels in accordance with the present invention were constructed as follows. A 10% solution of cyanoethyl starch in a 1/1 ratio acetone/dimethylformamide was prepared. This solution had a viscosity of 300 cps. To this solution, 30% by weight thereof of a copper activated zinc sulfide phosphor was added. The resulting slurry was sprayed on one surface of 1/8" thick pieces of glass over a tin oxide coating on said surface. The resulting cyanoethyl starch-phosphor film was dried rigorously in vacuo at 70° C. giving a dried film 0.002" thick. The resulting unit was then placed in a vacuum metalizing chamber and the exposed surface (i.e. the surface opposite the tin oxide coating) of the cyanoethyl starch-phosphor film was coated with a thin layer of aluminum by evaporating aluminum onto said surface. Electrodes were attached to the aluminum coating and the tin oxide coating and then the edges of the panel were sealed with an epoxy resin to exclude air.

The foregoing gave an electroluminescent panel having a brightness approximately 10% higher than the best prior art panel. Adhesion of the phosphor particles to the cyanoethyl starch was also substantially better than the best prior art panel. Use of the cyanoethyl starch of the present invention enabled obtaining higher solids at lower viscosities than the prior art, thereby making it easier to dry the cyanoethyl starch-phosphor film. In many cases it is also preferred to apply the phosphor and binder by compression molding or extruding rather than by spraying, and in this event the present invention offers a very distinct advantage over the prior art since the cyanoethyl starch-phosphor mixture is substantially more thermoplastic than corresponding mixtures of the prior art. The cyanoethyl starch used in the foregoing example had a dielectric constant of 18 and a dissipation factor of 0.02 which compares quite favorably with 12.5 dielectric constant and 0.1 dissipation factor of the best prior art binder.

Preferably the cyanoethyl starch binder of the present invention has the following characteristics:

Percent nitrogen: 11–13.
Degree of substitution (D.S.): 2.2–3.0, 2.5–3.0 being specifically preferred.
Viscosity, cps.: 25–1000 in 10% solution of a 1/1 by weight mixture of acetone/dimethylformamide.
10% solutions in said acetone/dimethylformamide are smooth but hazy; however, films cast from said solutions are clear and substantially free of gels or other impurities.

Although the preparation of cyanoethyl starch is well known in the art and although such preparation per se is not a part of the present invention, for the sake of completeness the process used in preparing the cyanoethyl starch employed in the examples of the present invention will now be given. 1 part starch was stirred with 12 parts acrylonitrile for 45 minutes in the presence of 1 part of 2% aqueous sodium hydroxide while heating to 50° C. The reaction was continued under these conditions until a dope substantially free of gel specks was obtained. This dope was filtered through a 20-mesh screen and precipitated by grinding with methanol. The precipitate was washed with water and then dried in vacuo at 65° C.

Using the same general procedure described above but varying the reaction temperature and time and the source of starch employed, cyanoethyl starches have been prepared having the properties shown in Table 1 hereinafter. They have been successfully used in electroluminescent panels in accordance with the present invention. The types of starch employed include wheat, corn, waxy maize and potato starch as well as 100% amylose and a 50/50 amylose/amylopectin corn starch. Also included were acid degraded and hypochlorite degraded wheat starches. As is well known, waxy maize is substantially 100% amylopectin.

of the cyanoethyl starch, the maximum D.S. theoretically possible (i.e. D.S. 3) works well, however, for good results one should not go below a D.S. of about 2.2. Best results have been obtained with a D.S. of 2.5–3.0. As compared with D.S. levels below 2.2, D.S. levels of 2.2 and above give better electrical properties

TABLE 1

| Reaction | | 10% Viscosity, cps. | D.S. | Dielectric [1] Constant | Dissipation [1] Factor |
|---|---|---|---|---|---|
| Time, hrs. | Temp., °C. | | | | |
| 1–6 | 50–75 | 54–650 | 2.2–3 | 16–24 | 0.016–0.06 |

[1] Determined at 25° C. and a frequency within the range of 60–1,000 cycles per second
The best dielectric constant and dissipation factor values reported in the literature for cyanoethyl cellulose are 13 and 0.02, respectively.

*Example 2.—Plastic Flow*

The plastic flow properties of the cyanoethyl starches used in the present invention and of the best known prior art material (cyanoethyl cellulose) used for the same purpose were determined on the application of heat and pressure in an Olson Bakelite Flow Tester. This is a standard testing device widely used in the plastics industry. It is described in ASTM method D 569–46A (ASTM Standards, 1958, Part 9, page 393). This device is perhaps more often referred to in the art as the Tinius Olson Flow Tester.

For these plastic flow tests the ether being tested was fused into a plastic mass by heat and pressure. This mass was ground to a fine powder and cylindrical pellets ⅜″ x ⅜″ were formed from this powder in a pelleting machine. The pellets were placed in the Tinius Olson Flow Tester and the plastic flow thereof measured under the conditions shown in Table 2 hereinafter.

and also better resistance to moisture. Increased resistance to moisture increases the panel life and of course better electrical properties (such as e.g. higher dielectric strength and lower dissipation factor) increase the performance of the panel.

Although the phosphor-cyanoethyl starch films of the foregoing examples were dried first in air and then in an oven, the type of drying is not critical. For instance, either air drying, oven drying or other well known methods of drying may be employed with good results.

Since a number of the variables involved are well known in the art and since they are not per se a part of the present invention, they will now be described only very briefly for the sake of completeness and perhaps clarity.

The thickness of the phosphor-cyanoethyl starch film is not critical. Such films having a thickness of 1–3.5 mils gave good results in accordance with the present

TABLE 2.—PLASTIC FLOW PROPERTIES OF CYANOETHYL STARCH AND CYANOETHYL CELLULOSE

| Ether Tested | D.S. | Viscosity, cps.[1] | Tinius-Olson Flow | | |
|---|---|---|---|---|---|
| | | | Temp., °C. | Pressure, p.s.i. | Flow, in./2 min. |
| Cyanoethyl cellulose | 2.6 | 117 | 173 | 1,000 | 0.00 |
| | 2.6 | 117 | 150 | 500 | 0.75 |
| Cyanoethyl starch | 2.45 | 285 | 120 | 300 | 0.32 |
| | 2.45 | 285 | 150 | 300 | 1.14 |
| Do | 2.53 | 30 | 90 | 300 | 1.07 |
| | 2.53 | 30 | 150 | 300 | 9.1 |

[1] 10% in acetone/dimethylformamide (1/1 by weight).

As pointed out hereinbefore, preparation of the cyanoethyl starch binder employed herein is not per se a part of the present invention and numerous methods of preparing it are known. Obviously then it is not intended to restrict the present invention to methods of preparing cyanoethyl starch useful herein. The starches which one may start with to prepare the cyanoethyl starch applicable in the present invention may be derived from any sources, including e.g. corn, wheat, tapioca, potato, waxy maize, sago and rice. The term "starch" as used herein is intended to include substantially 100% amylose, substantially 100% amylopectin as well as any combination of amylose and amylopectin. Wheat starch has the advantage of being readily available and of being comparatively low cost.

It is conventional practice in the art to use cyanoethyl cellulose as a 10% solution in a 1/1 weight ratio of acetone/dimethylformamide and for this reason the cyanoethyl starch of the present invention and the cyanoethyl cellulose with which it was compared was used likewise. However, this is not necessary and was done only for a more direct comparison.

"Degree of substitution" ("D.S.") is used herein to mean the average number of hydroxyl groups substituted in the starch per anhydroglucose unit. As to D.S.

invention. Also, as is well known in the art the thickness of the various other layers may be varied as desired (see for example U.S. Patent 2,566,349). Prior art phosphors in general are applicable in the present invention. Some of these phosphors are described in U.S. Patents 2,566,349 and 2,731,423. Likewise, instead of the tin oxide coating used herein to coat the glass, the art knows of many other coatings which may be used. These include, e.g., oxides of indium, cadmium, zinc, etc., as well as various salts of these metals (see e.g. U.S. Patent 2,774,004). Also, various other transparent materials may be used in place of the glass. Of course, instead of the epoxy resin used herein, there are many other suitable materials which may be used for waterproofing. For instance, waxes are satisfactory.

As many apparent and widely different embodiments of this invention may be made without departing from the spirit and scope thereof, it is to be understood that the invention is not limited to the specific embodiments thereof except as defined in the appended claims.

What we claim and desire to protect by Letters Patent is:

1. An electroluminescent panel comprising (a) a light transmitting electrically conductive layer, (b) a layer over layer (a) of a field responsive phosphor in cyanoethyl starch and (c) an electrically conductive layer over layer (b).

2. The panel of claim 1 wherein the degree of substitution of the cyanoethyl starch is about 2.3–3.

3. The panel of claim 1 wherein the degree of substitution of the cyanoethyl starch is about 2.6–2.9.

4. The panel of claim 1 wherein the cyanoethyl starch is cyanoethyl wheat starch.

References Cited by the Examiner
UNITED STATES PATENTS 3,247,414   4/1966   Levetan _____ 313—108

ALFRED L. LEAVITT, *Primary Examiner.*

WILLIAM L. JARVIS, *Examiner.*